United States Patent
Liu et al.

(10) Patent No.: US 12,028,391 B2
(45) Date of Patent: Jul. 2, 2024

(54) SYSTEM AND METHOD FOR CONTROLLING MULTI-PARTY COMMUNICATION

(71) Applicants: Foxconn Technology Group Co., Ltd., Shenzhen (CN); HON HAI PRECISION INDUSTRY CO., LTD., New Taipei (TW)

(72) Inventors: Young-Way Liu, New Taipei (TW); Jung-Yi Lin, New Taipei (TW)

(73) Assignees: Foxconn Technology Group Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 18/111,483

(22) Filed: Feb. 17, 2023

(65) Prior Publication Data

US 2023/0269284 A1    Aug. 24, 2023

(30) Foreign Application Priority Data

Feb. 18, 2022   (CN) .......................... 202210152330.7

(51) Int. Cl.
*H04L 65/4038* (2022.01)
*G06F 3/01* (2006.01)

(52) U.S. Cl.
CPC .......... *H04L 65/4038* (2013.01); *G06F 3/017* (2013.01)

(58) Field of Classification Search
CPC ............................. H04L 65/4038; G06F 3/017
See application file for complete search history.

(56) References Cited

U.S. PATENT DOCUMENTS

| | | | | |
|---|---|---|---|---|
| 9,263,044 | B1* | 2/2016 | Cassidy | G06V 10/75 |
| 10,652,655 | B1* | 5/2020 | Weldemariam | H04R 27/00 |
| 2011/0043602 | A1* | 2/2011 | Lee | H04L 45/586 |
| | | | | 379/202.01 |
| 2014/0185785 | A1* | 7/2014 | Bouknight, Jr. | H04M 3/56 |
| | | | | 379/202.01 |
| 2018/0309937 | A1* | 10/2018 | Yoshino | G09G 5/14 |
| 2019/0297304 | A1* | 9/2019 | Li | H04N 7/15 |

(Continued)

FOREIGN PATENT DOCUMENTS

| | | |
|---|---|---|
| CN | 110913062 A | 3/2020 |
| CN | 111696538 A | 9/2020 |

(Continued)

*Primary Examiner* — Philip C Lee
(74) *Attorney, Agent, or Firm* — ScienBiziP, P.C.

(57) ABSTRACT

A system and method for controlling multi-party communication during video conferences communicatively connects with at least two participating terminals, each manned by one participant in the conference. A voice acquisition module acquires speech and video at each participating terminal. A recognition module acquires information as to an action state of a participant in the video and audio of what participant is saying, and determines whether the action of participant includes speaking movements and whether the audio includes what is being said by the participant. A control module can control the volume of other participating terminals and adjust the volumes of microphones of simultaneous speakers, to be louder, fainter, or muted, depending on assigned priority of each participant, for orderly control of conferences and as an overall recording.

18 Claims, 4 Drawing Sheets

(56) References Cited

U.S. PATENT DOCUMENTS

| | | | |
|---|---|---|---|
| 2019/0306297 A1* | 10/2019 | Irukuvajhula | H03G 3/3005 |
| 2021/0374391 A1* | 12/2021 | Jorasch | G06V 20/20 |
| 2022/0225050 A1* | 7/2022 | Ninan | G06F 3/0308 |
| 2022/0279073 A1* | 9/2022 | Li | H04M 3/565 |

FOREIGN PATENT DOCUMENTS

| | | | |
|---|---|---|---|
| CN | 112633208 A | 4/2021 | |
| WO | WO-2013058728 A1 * | 4/2013 | G06K 9/00624 |

\* cited by examiner

SYSTEM AND METHOD FOR CONTROLLING MULTI-PARTY COMMUNICATION

CROSS-REFERENCE TO RELATED APPLICATIONS

This application claims priority to Chinese Patent Application No. 202210152330.7 filed on Feb. 18, 2022, in China National Intellectual Property Administration, the contents of which are incorporated by reference herein.

FIELD

The subject matter herein generally relates to computer signal processing technical field, particularly relates to a system and method for controlling multi-party communication.

BACKGROUND

With a rapid development of remote work, remote video conferences are gradually becoming widely used. In a remote video conference scenario, participants, who are usually in the same conference, may be in different locations and equipped with multiple voice acquisition devices. When a plurality of voice acquisition devices are simultaneously acquiring and playing, the presentation or speech by another participant can be drowned or lost.

At present, when a remote video conference is carried out, a participant or a conference attendee needs to start or switch off a voice acquisition device, and the switching efficiency is low.

Therefore, there is room for improvement within the art.

BRIEF DESCRIPTION OF THE DRAWINGS

Implementations of the present disclosure will now be described, by way of embodiments, with reference to the attached figures.

DETAILED DESCRIPTION

Figure 1:
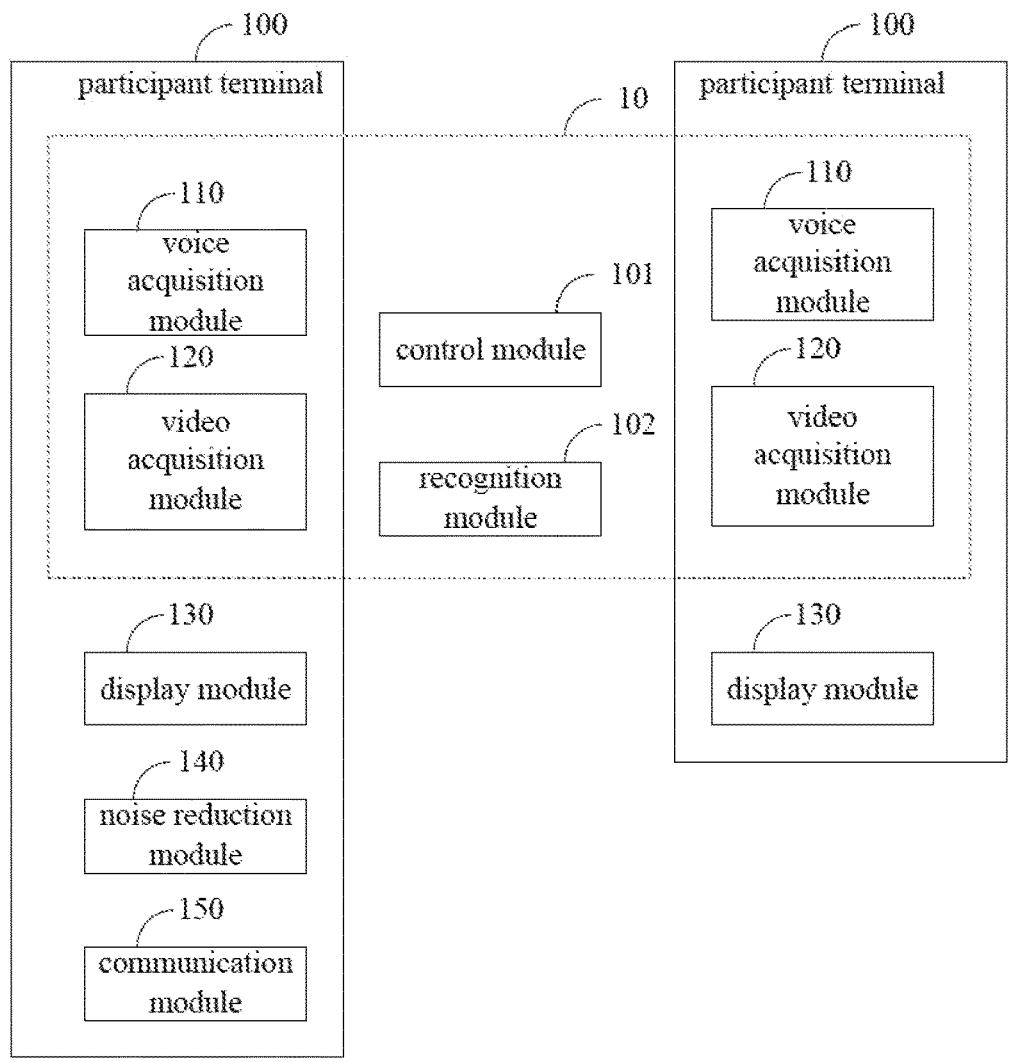
FIG. 1 is a diagram of an embodiment of a system for controlling multi-party communication according to the present disclosure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

Remote video conferences are common. In a remote video conference scenario, participants, who are usually in the same conference, may be in different locations and each is equipped with own voice acquisition device. When a number of voice acquisition devices are simultaneously acquiring and playing voice, the presentation or discussion of a main purpose can be influenced.

When a remote video conference is carried out today, a participant or a conference host needs to start or switch off a voice acquisition device, and the switching efficiency is low.

The present disclosure provides a method and system for controlling multi-party communication.

FIG. 1 illustrates a system for controlling multi-party communication 10 according to one embodiment of the present disclosure. As shown in FIG. 1, system 10 at least includes a control module 101, a recognition module 102, a voice acquisition module 110, and a video acquisition module 120.

In one embodiment of the present disclosure, the voice acquisition module 110 and the video acquisition module 120 are configured in a participating terminal 100. The voice acquisition module 110 is configured for acquire a voice spoken to the participating terminal 100. The video acquisition module 120 is configured for acquiring video captured by the participating terminal 100. The system 10 acquires the spoken voice and the captured video from the voice acquisition module 110 of the participating terminal 100.

For instance, the voice acquisition module 110 can include one or more microphone(s) to acquire the voice of participants at the participating terminal 100. The participating terminal 100 can include a noise reduction module 140. The noise reduction module 140 is configured for processing the voice information of the participant after the voice acquisition module 110 acquires the voice information of the participant, to suppress noise. Specifically, after the voice information of the participant is collected by the voice acquisition module 110, the voice information is subjected to noise reduction processing by the noise reduction module 140, and the noise reduction module 140 transmits the voice information without noise to the recognition module 102 of the system 10.

The microphone also known as "voice tube" or "mike", converts voice signals into electrical signals. When a call is made or voice information is sent, a participant can input his voice signal into the microphone by speaking to the microphone. The participant terminal 100 can include at least one microphone. In other embodiments, the participant terminal 100 may be provided with two microphones to achieve an enhanced noise reduction function in addition to collecting voice signals. In other embodiments, the participant terminal 100 may further include three, four, or more microphones to collect voice signals and reduce noise. The participant terminal 100 can further identify sound sources and implement directional recording functions.

The video acquisition module 120 can include one or more camera(s) to acquire video information of participants at the participating terminal 100. For instance, the video acquisition module 120 can include a video compression module. The video compression module is configured for compressing the video information to reduce the volume of data of the video information, which reduces pressure of transmitting large quantities of data when the participant terminal 100 communicates with the system 10.

The video acquisition module 120 is configured to capture still images or video. The object reflects light into the lens and projects an optical image to the photosensitive element. The photosensitive element can be a Charge Coupled Device (CCD) or a complementary metal-oxide-semiconductor (CMOS) phototransistor. In some embodiments, the participant terminal 100 can include 1 or N video capture modules 120, N being a positive integer greater than 1.

The participant terminal 100 further includes a communication module 150. The communication module 150 is configured for transmitting the voice information collected by the voice acquisition module 110 and the video information collected by the video acquisition module 120. The collected the voice and video information is transmitted to the recognition module 102 in the system 10. The communication module 150 is further configured to receive the voice and video information from all participants speaking action from a person in a presentation state in the system 10.

It is understood that the communication module 150 may communicate with the network and other devices via wireless communication techniques. The wireless communication technology may include global system for mobile communications (GSM), General Packet Radio Service (GPRS), Code Division Multiple Access (CDMA), Wideband Code Division Multiple Access (WCDMA), time-division code division multiple access (TD-SCDMA), long term evolution (long term evolution, LTE), BT, GNSS, WLAN, NFC, FM, and/or IR technologies, etc. The GNSS may include a Global Positioning System (GPS), a global navigation satellite system (GLONASS), a beidou satellite navigation system (BDS), a quasi-zenith satellite system (QZSS), and/or a Satellite Based Augmentation System (SBAS).

It is understood that each participant terminal 100 further includes at least a display module 130. The display module 130 is configured to display conference video and/or conference audio.

For instance, the display module 130 can be a display device with an audio playing function. The display module 130 can be a separate display device or a separate voice playing device. The display module 130 is used to display conference video and/or conference audio.

For instance, the display module 130 includes a display panel. The display panel may be a Liquid Crystal Display (LCD), an organic light-emitting diode (OLED), an active-matrix organic light-emitting diode (active-matrix organic light-emitting diode, AMOLED), a flexible light-emitting diode (FLED), a miniature, a Micro-OLED, a quantum dot light-emitting diode (QLED), or the like. In some embodiments, participant terminal 100 may include 1 or N display modules 130, where N is a positive integer greater than 1. In some embodiments, the display module 130 can include a full screen dimension which is a fixed size.

The control module 101 can be a first processor, The recognition module 102 can be a second processor. The first processor and the second processor each can be one or more central processing units, or can be one or more other universal processors, digital signal processors, application specific integrated circuits, field-programmable gate arrays, or other programmable logic devices, discrete gate or transistor logic, discrete hardware components, and so on. The first processor and the second processor each can be a microprocessor or each can be any regular processor or the like. In some embodiments, the first processor and the second processor can be different processors. It can be understood that, the first processor and the second processor can be the same processor.

The control module 101 and the recognition module 102 of the system 10 can be configured on a server (not shown), and the control module 101 is communicatively connected to the recognition module 102. The control module 101 can generate a switching instruction to switch the microphone of a participant terminal 100 to a low volume state, a mute state, or a full-on state.

In some embodiments, the control module 101 is further configured to generate commands to adjust the volume of the microphone of a participant terminal 100.

In some embodiments, the control module 101 is configured to control the display module 130 to display the video information from participant terminal 100 if the video information from participant terminal 100 is not displayed. If the video information from the participant terminal 100 is already displayed by the display module 130, the control module 101 can adjust the display area of the display module 130 for the video frame from the participant terminal 100. For instance, the control module 101 may adjust a video screen of the participant terminal 100 to be centered, enlarged, etc. in the display area of the display module 130.

For example, if the voice volume of the first participating terminal is adjusted to be higher than the voice volume of other participating terminals, and the video information of the first participating terminal is not being displayed, the control module 101 displays the video information of the first participating terminal.

For example, if the voice volume of the first participating terminal is adjusted to be higher than the voice volume of other participating terminals, and the video information of the first participating terminal is being displayed in a first size which is smaller than a second size on a display module, the control module 101 adjusts a display region of the video information of the first participating terminal to be the second size which is smaller than or the same as a full screen dimension of the display module.

The recognition module 102 is communicatively connected to the video acquisition module 120 to recognize currently-speaking status of the speaker in the video information captured by the video acquisition module 120. The recognition module 102 is further configured to determine whether the speaker is speaking currently according to information of his state of activity (action information). For instance, the recognition module 102 can include an Artificial Intelligence (AI) sub-module. The AI sub-module can include a neural network to realize the action information identification in the video information. The recognition module 102 transmits a recognition result to the control module 101, so that the control module 101 determines whether to generate a switching instruction, an adjustment instruction, or other command.

For instance, the action information can include the mouth movement and shape, hand gestures, body motions, and the like. The recognition module 102 can transmit the video recognition information to the control module 101 after recognizing mouth shape, a specific gesture, or a specific body movement, so that the control module 101 determines whether to generate the switching instruction or the adjusting instruction. Specific gestures include, but are not limited to, arm-lifting, hand-waving, raised fingers, crossed fingers, and the like. Specific limb actions include leaning forward, head raised, chest pushed out, and nodding and shaking head.

A storage sub-module (not shown) may be configured in the recognition module 102. The recognition module 102 can store the action information of the user before speaking in the storage sub-module, so as to more accurately recognize that the user is about to speak according to the action information. The recognition module 102 transmits the recognized information to the control module 101, so that the control module 101 can make a determination.

The system 10 does not have an independent communication module. The system 10 communicates with the participant terminal 100 through the communication module 150 of the participant terminal 100. Of course, in other embodiments, the system can also directly include the communication module 150, that is, the communication module 150 of the participant terminal 100 is directly utilized to implement communication between the communication module 150 and other devices, for example, a server.

Referring again to FIG. 1, the system 10 can also detect priorities of different participant terminals 100, and perform grading according to different priorities. For instance, the priorities may be classified as, for example, the first priority, the second priority, and the third priority, where the participant giving a presentation or hosting/chairing a meeting may have first priority, a Recording Secretary/Minutes Recorder may have second priority, and so on. When detecting that the user A is speaking, the recognition module 102 of the system 10 first detects the priority corresponding to the user A. When the system 10 detects that there is a speaking participant with higher priority than the user A, the microphone volume of the user A can be adjusted to a lower volume, and the microphone volume of the speaking participant with the higher priority can be adjusted to a higher volume. When a participant with lower priority is speaking, the microphone is lowered in volume or muted, and if a speaker is equal to the priority of the user A, no change is made.

For instance, the following embodiment illustrates three users (for example, a user A, a user B, and a user C) to describe the process of the system 10 provided by the present application. Assume that the user A has a second priority, the user B has a third priority, and the user C has a first priority. Each of the user A, the user B, and the user C has a different participant terminal 100 to participate in a video conference.

The system 10 establishes connections with participant terminals 100. After the user A begins to speak, the voice acquisition module 110 and video acquisition module 120 transmit the collected voice and video signals to the recognition module 102 of system 10.

The recognition module 102 in the system 10 is configured to determine whether the shape of mouth in the video signal indicates speaking. The recognition module 102 is further configured to determine whether a voice signal from that voice acquisition module 110 is received. When the recognition module 102 determines that the mouth in the video signal indicates speech and the voice acquisition module 110 can acquire the voice signal, the recognition module 102 sends the recognition result to the control module 101. The control module 101 transmits the voice signal and the video signal of the user A to other participant terminals according to the recognition result. Meanwhile, the control module 101 sends a switching command to the participant terminals 100 corresponding to the user B and user C, so as to switch the respective microphones of the user B and the user C to a low volume state (i.e. turn down the microphone volumes of the users B and C) or a mute state.

During the speaking action of the user A, the system 10 may collect the voice signal from the user B through the voice acquisition module 110. The system 10 may also determine that the mouth shapes of the user B, through the recognition module 102, indicates a speaking. The priority of the user B is further detected. Since the priority of the user B is the third priority and lower than the priority of the user A, the control module 101 puts the microphone of the user B in the low volume state. It can be understood that, when the recognition module 102 detects that the user B is speaking, a content or vocabulary of the utterance of user B may be further detected, and if the utterance of the user B includes one or more pre-set keywords, such as words like "I guess", "I suppose", etc., the control module 101 increases the microphone volume of the user B and decreases the microphone volume of the user A. It can be understood that, when the recognition module 102 detects that the user B is speaking, an action information may be further detected, and if the action information includes pre-set action information, the control module 101 increases the microphone volume of the user B and decreases the microphone volume of the user A. The pre-set action information can be, for example arm-lifting, hand-waving, raised fingers, crossed fingers, leaning forward, head raised, chest pushed out, nodding and shaking head, and the like.

During the speaking action of the user A, the voice signal may be collected from the user C by the voice acquisition module 110. The recognition module 102 determines that the mouth shape of the user C indicates a speaking action, and the system further detects the priority of the user C. Since the account priority of the user C is the first priority and is higher than the account priority of the user A, the control module 101 increases the volume of the microphone of the user C and decreases the volume of the microphone of the user A. The control module 101 may also turn off the microphone volume of user A and turn up the microphone volume of user C, so that the participants can clearly listen to the speaking by user C. After the user C stops speaking, the volume of the microphone of the user C is reduced, and the volume of the microphone of the user A is increased, so that the participants can clearly listen to the speaking of the user A. After the recognition module 102 determines that the user A stops speaking, and the recognition module 102 determines that the user B or the user C starts speaking, the control module 101 decreases the microphone volume of the user A and increases the microphone volume of the user B or the user C.

Figure 2:
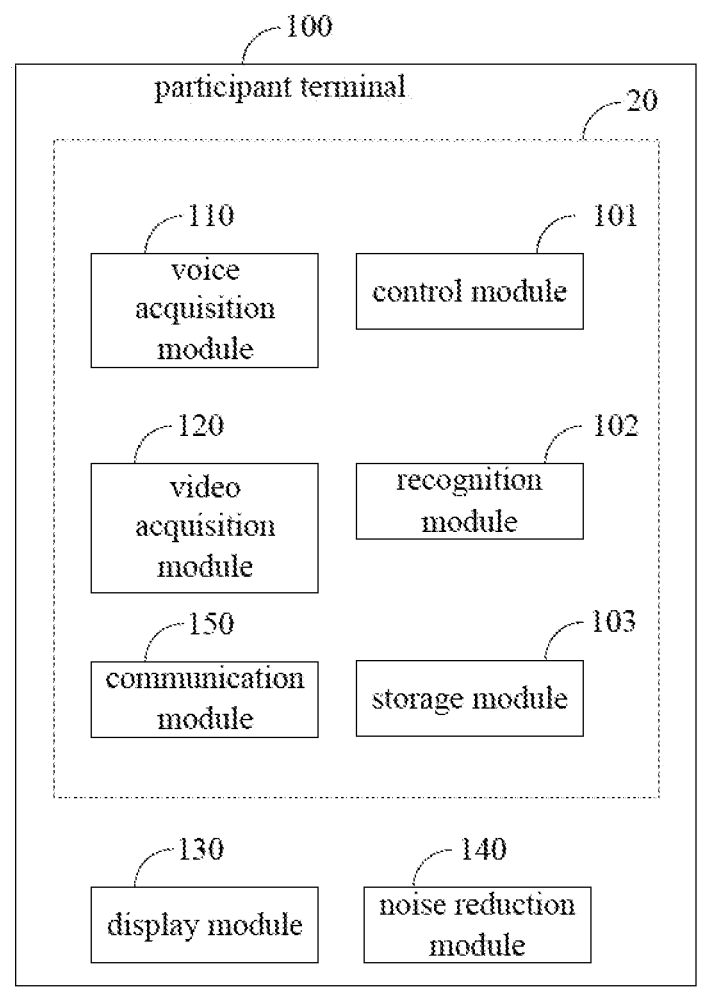
FIG. 2 is a diagram of another embodiment of a control system according to the present disclosure.

Referring to FIG. 2, FIG. 2 is a diagram of a system for controlling multi-party communication 20 according to another embodiment of the present disclosure. The system 20 includes a control module 101, a recognition module 102, a voice acquisition module 110, and a video acquisition module 120. The system 20 shown in FIG. 2 is different from the system 10, in that the system 20 is integrally set in the participant terminal 100. Additionally, the system 20 further includes a storage module 103.

The functions, connection relationships, and the like of the control module 101, the recognition module 102, voice acquisition module 110, and the video acquisition module 120 are similar to those of the system of FIG. 1 and the related description thereof, and are not repeated herein. The storage module 103 may be configured to store the video information and the voice information of participants during a video conference, so as to implement full-time recording or partial recording of the conference.

For instance, if the system 20 detects that the participant has not spoken for a long time, the whole or part of the recorded conference content stored in the storage module 103 in advance may be replayed or played back.

The system 20 transmits information with a note (noted information) that no-one is speaking audibly when the voice acquisition module 110 cannot collect the voice information. After receiving the noted information, the control module 101 retrieves the conference content pre-recorded in the storage module 103 and transmits the conference content pre-recorded to the conference terminal 100.

The control module 101 can apply time tags to the pre-recorded conference content, where each time tag corresponds to a segment of conference content. The control module 101 can select the conference segment to be played or played back by selecting the corresponding time tag.

Since different participant terminals 100 may be under different network environments, there may be a period of time during which some of the participant terminals 100 do not receive conference video and/or conference audio from the system 20 due to a network failure. For instance, if no participant is speaking within 1 minute period, the system 20 may play the pre-recorded whole or part of the recorded conference content, so that a terminal 100 which is not receiving the conference video and/or the conference audio can play or replay the video or audio conference content that is not being received.

For instance, the control module 101 can detect the number of the participant terminals 100 in the video conference process, and when the pre-recorded conference content needs to be played, can select a conference content time tag with the smallest number of the participant terminals 100 taking part, and play the conference content corresponding to the time tag.

The system 10 and the system 20 according to the embodiment of the present application can acquire the video information and the voice information through the participant terminal 100, determine whether the action information in the video information indicates a speaking action and whether the voice information includes the audio information, and switch or adjust the voice and video of the participant terminal displayed in the video conference if the action information is the speaking action and the voice information includes the audio information. The voice and the video displayed in the video conference can be switched or adjusted according to the video information and the voice information, and the process of orderly control of the video conference is simplified.

Figure 3:
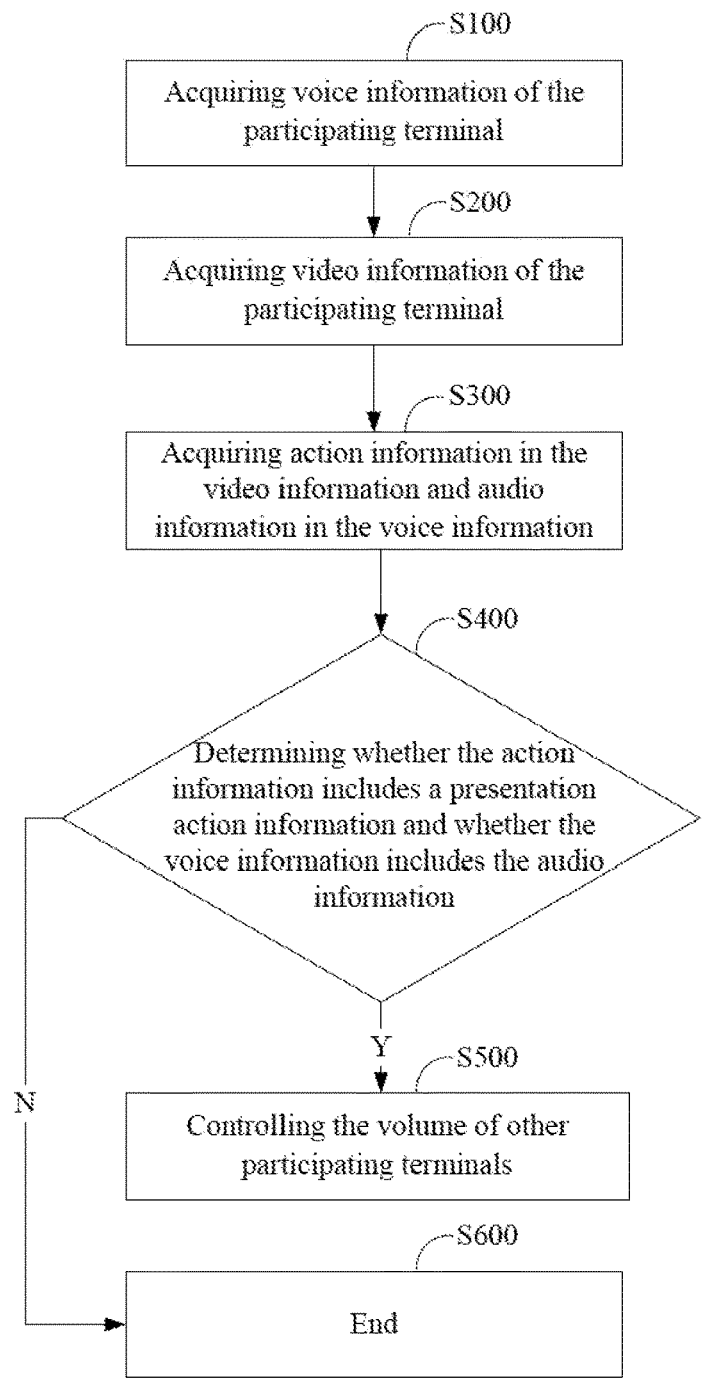
FIG. 3 is a flowchart of an embodiment of a method for controlling multi-party communication according to the present disclosure.

FIG. 3 illustrates a flowchart of an embodiment of the method for controlling multi-party communication. The embodiment is provided by way of example, as there are a variety of ways to carry out the method. The method includes acquiring voice information of the participating terminals; acquiring video information of the participating terminal; acquiring action information in the video information and audio information in the voice information, and determining whether the action information includes the speaking action information and whether the voice information includes the audio information; controlling the volume of other participating terminals and adjusting the volume of the voice information from the first participating terminal when the action information of a first participating terminal is the speaking action and the voice information includes the audio information. The method described below can be carried out using the configurations illustrated in FIGS. 1, and 2, for example, and various elements of these figures are referenced in explaining the embodiment. Each block shown in FIG. 3 represents one or more processes, methods, or subroutines carried out in the embodiment. Furthermore, the illustrated order of blocks is by example only, and the order of the blocks can be changed. Additional blocks can be added or fewer blocks can be utilized, without departing from this disclosure. This method can begin at block S100.

At block S100, the voice acquisition module 110 in the system 10 acquires the voice information of the participating terminals. The method of acquiring the voice information of the participating terminals can be referred to in conjunction with FIG. 1, and FIG. 2 and is not described herein again.

At block S200, the video acquisition module 120 in the system 10 acquires the video information of the participating terminal. The method of acquiring the video information of the participating terminals can be referred to in conjunction with FIG. 1, and FIG. 2 and is not described herein again.

At block S300, the recognition module 102 in the system 10 acquires the action information in the video information and the audio information in the voice information. The method of acquiring the action information and the audio information can be referred to in conjunction with FIG. 1, and FIG. 2 and is not described herein again.

At block S400, the recognition module 102 in the system 10 determines whether the video information includes the speaking action information and whether the voice information includes the audio information. The method of determining whether the action information includes the speaking action information and whether the voice information includes the audio information can be referred to in conjunction with FIG. 1, and FIG. 2 and is not described herein again.

At block S500, the control module 101 in the system 10 controls the volume of other participating terminals and adjusting the volume of the voice information from the first participating terminal when the action information of a first participating terminal is the speaking action and the voice information includes the audio information. The method of controlling the volume of other participating terminals and adjusting the volume of the voice information from the first participating terminal when the action information of a first participating terminal is the speaking action and the voice information includes the audio information can be referred to in conjunction with FIG. 1, and FIG. 2 and is not described herein again.

At block S600, if the action information of a first participating terminal is not speaking action or the voice information does not include the audio information, no operation is performed for the control module 101 in the system 10.

Figure 4:
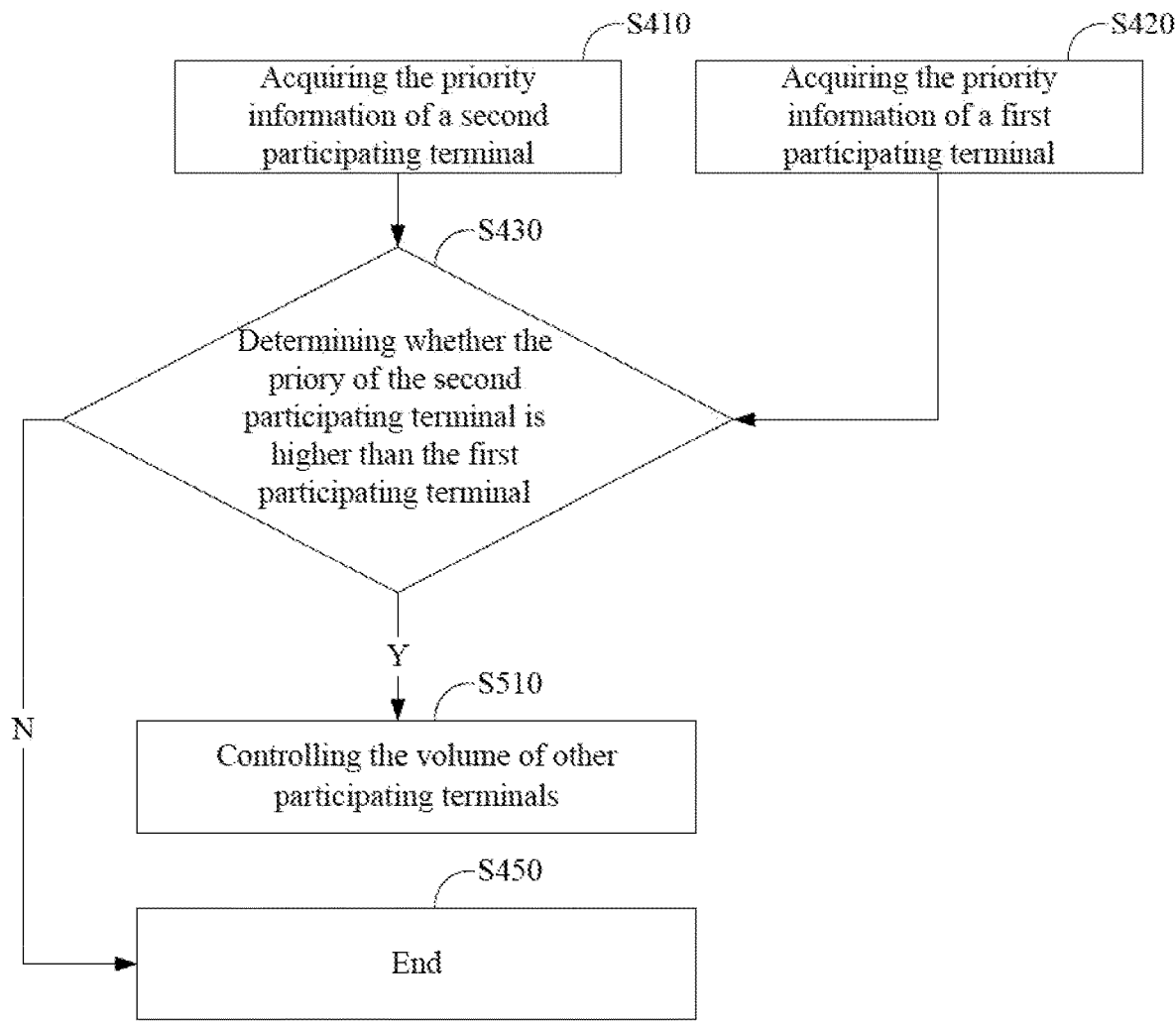
FIG. 4 is a flowchart of another embodiment of a method according to the present disclosure.

FIG. 4 illustrates a flowchart of an embodiment of substep of the step S400 in FIG. 3. The embodiment is provided by way of example, as there are a variety of ways to carry out the method. The method includes acquiring account priority of a second participating terminal and a first participating terminal; determining if the priory of the second participating terminal is higher than the first participating terminal; adjusting the volume of the second participating terminal and the first participating terminal according to the priory. The method described below can be carried out using the configurations illustrated in FIGS. 1, and 2, for example, and various elements of these figures are referenced in explaining the embodiment. Each block shown in FIG. 4 represents one or more processes, methods, or subroutines carried out in the embodiment. Furthermore, the illustrated order of blocks is by example only, and the order of the blocks can be changed. Additional blocks can be added or fewer blocks can be utilized, without departing from this disclosure. This method can begin at block S410.

At block S410, the control module 101 acquires the priority information of a second participating terminal. The method of acquiring the account priority can be referred to in conjunction with FIG. 1, and FIG. 2 and is not described herein again.

At block S420, the control module 101 acquires the priority information of a first participating terminal. The method of acquiring the account priority can be referred to in conjunction with FIG. 1, and FIG. 2 and is not described herein again.

At block S430, the control module 101 determines whether the priory of the second participating terminal is higher than the first participating terminal. The method of determining can be referred to in conjunction with FIG. 1, and FIG. 2 and is not described herein again.

At block S510, the control module 101 controls the volume of the second participating terminal and the first participating terminal according to the priory. The method of controlling can be referred to in conjunction with FIG. 1, and FIG. 2 and is not described herein again.

At block S450, no operation is performed for the control module 101 if the priory of the second participating terminal is lower than the priory of the first participating terminal.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A system for controlling multi-party communication connecting to at least two participating terminals, the system comprising:
a voice acquisition module configured for acquiring voice information of the at least two participating terminals;
a video acquisition module configured for acquiring video information of the at least two participating terminals;
a recognition module configured for acquiring an action information in the video information and acquiring audio information in the voice information, determining whether the action information comprises a speaking action and whether the voice information comprises the audio information; and,
a control module configured for controlling a voice volume of other participating terminals and adjusting the volume of the voice information from a first participating terminal when the action information of the first participating terminal comprises the speaking action and the voice information comprises the audio informations;
wherein the control module is further configured for:
if the voice volume of the first participating terminal is adjusted to be higher than the voice volume of other participating terminals, and the video information of the first participating terminal is not being displayed, displaying the video information of the first participating terminal.

2. The system of claim 1, wherein the at least two participating terminals comprises the first participating terminal and a second participating terminal, when the recognition module recognized at least two participating terminals presenting, the control module is further configured for:
acquiring priority information of the first participating terminal and the second participating terminal;
adjusting the voice volume of the participating terminals according to the priority information.

3. The system of claim 2, wherein the control module is further configured for:
if the priority of the second participating terminal is higher than the priority of the first participating terminal, adjusting the voice volume of the second participating terminal and the voice volume of the first participating terminal until the volume of the second participating terminal is higher than the voice volume of the first participating terminal.

4. The system of claim 2, wherein the control module is further configured for:
if the priority of the second participating terminal is lower than the priority of the first participating terminal, determining whether the audio information from the second participating terminal comprises a pre-set keyword;
if the audio information from the second participating terminal comprises the pre-set keyword, adjusting the voice volume of the second participating terminal and the voice volume of the first participating terminal until the volume of the second participating terminal is higher than the voice volume of the first participating terminal.

5. The system of claim 2, wherein the control module is further configured for:
if the priority of the second participating terminal is lower than the priority of the first participating terminal, determining whether the video information from the second participating terminal comprises pre-set action information,
if the video information from the second participating terminal comprises the pre-set action information, adjusting the voice volume of the second participating terminal and the voice volume of the first participating terminal until the volume of the second participating terminal is higher than the voice volume of the first participating terminal.

6. The system of claim 5, wherein the pre-set action information comprises a mouth shape, a hand gesture, and a body motion.

7. The system of claim 1, wherein the voice acquisition module and the video acquisition module are configured in the first participating terminal; the recognition module and the control module are configured in a server.

8. The system of claim 1, wherein the voice acquisition module, the video acquisition module, the recognition module, and the control module are configured in the first participating terminal.

9. The system of claim 1, wherein control module is further configured for:
if the voice volume of the first participating terminal is adjusted to be higher than the voice volume of other participating terminals, and the video information of the first participating terminal is being displayed in a first size which is smaller than a second size on a display module, adjusting a display region of the video information of the first participating terminal to be the second size which is smaller than or the same as a full screen dimension of the display module.

10. The system of claim 9, wherein the system further comprises:
a storage module, the storage module is configured for storing the video information and the voice information of the at least two participating terminals.

11. A method of controlling multi-party communication applied to a system for controlling multi-party communication, the system for controlling multi-party communication connecting to at least two participating terminals, the method comprising:
acquiring voice information of the at least two participating terminals;
acquiring video information of the at least two participating terminals;
acquiring an action information in the video information and acquiring audio information in the voice information;
determining whether the action information comprises a speaking action and whether the voice information comprises the audio information;
controlling a voice volume of other participating terminals and adjusting the volume of the voice information from a first participating terminal when the action information of the first participating terminal comprises the speaking action and the voice information comprises the audio information; and
if the voice volume of the first participating terminal is adjusted to be higher than the voice volume of other participating terminals, and the video information of the first participating terminal is not being displayed, displaying the video information of the first participating terminal.

12. The method of claim 11, wherein the at least two participating terminals comprises the first participating terminal and a second participating terminal, when at least two participating terminals presenting is recognized, the method further comprises:
acquiring priority information of the first participating terminal and the second participating terminal;
adjusting the voice volume of the participating terminal according to the priority information.

13. The method of claim 12, wherein the method further comprises:
if the priority of the second participating terminal is higher than the priority of the first participating terminal, adjusting the voice volume of the second participating terminal and the voice volume of the first participating terminal until the volume of the second participating terminal is higher than the voice volume of the first participating terminal.

14. The method of claim 12, wherein the method further comprises:
if the priority of the second participating terminal is lower than the priority of the first participating terminal, determining whether the audio information from the second participating terminal comprises a pre-set keyword;
if the audio information from the second participating terminal comprises the pre-set keyword, adjusting the voice volume of the second participating terminal and the voice volume of the first participating terminal until the volume of the second participating terminal is higher than the voice volume of the first participating terminal.

15. The method of claim 12, wherein the method further comprises:
if the priority of the second participating terminal is lower than the priority of the first participating terminal, determining whether the video information from the second participating terminal comprises a pre-set action information,
if the video information from the second participating terminal comprises the pre-set action information, adjusting the voice volume of the second participating terminal and the voice volume of the first participating terminal until the volume of the second participating terminal is higher than the voice volume of the first participating terminal.

16. The method of claim 15, wherein the pre-set action information comprises a mouth shape, a hand gesture, and a body motion.

17. The method of claim 11, wherein the method further comprises:
if the voice volume of the first participating terminal is adjusted to be higher than the voice volume of other participating terminals, and the video information of the first participating terminal is being displayed in a first size which is smaller than a second size on a display module, adjusting a display region of the video information of the first participating terminal to be the second size which is smaller than or the same as a full screen dimension of the display module.

18. The method of claim 11, wherein the method further comprises:
storing the video information and the voice information of the at least two participating terminals.

* * * * *